Figure 1:
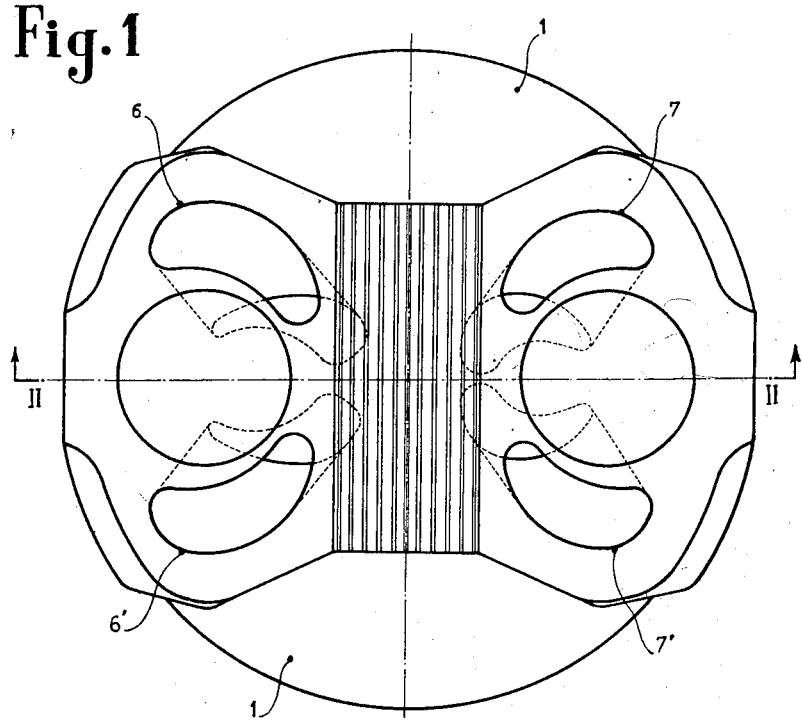

Feb. 23, 1954  R. H. MARCHAL ET AL  2,669,984
INTERNAL-COMBUSTION ENGINE
Filed Aug. 3, 1949  7 Sheets—Sheet 1

INVENTORS
Raymond H. Marchal
& Maurice L. Fabre

By Watson, Cole, Grindle & Watson

INVENTORS
Raymond H. Marchal
+ Maurice L. Fabre
By Watson, Cole, Grindle + Watson Feb. 23, 1954 — R. H. MARCHAL ET AL — 2,669,984
INTERNAL-COMBUSTION ENGINE INVENTORS
Raymond H. Marchal
& Maurice L. Fabre
By Watson, Cole, Grindle & Watson Feb. 23, 1954  R. H. MARCHAL ET AL  2,669,984
INTERNAL-COMBUSTION ENGINE
Filed Aug. 3, 1949  7 Sheets-Sheet 4

INVENTORS
Raymond H. Marchal
+ Maurice L. Fabre

By Watson, Cole, Grindle & Watson

Feb. 23, 1954  R. H. MARCHAL ET AL  2,669,984
INTERNAL-COMBUSTION ENGINE
Filed Aug. 3, 1949  7 Sheets-Sheet 5

INVENTORS
Raymond H. Marchal
+ Maurice L. Fabre
By Watson, Cole, Grindle + Watson Patented Feb. 23, 1954

2,669,984

UNITED STATES PATENT OFFICE 2,669,984

INTERNAL-COMBUSTION ENGINE

Raymond H. Marchal and Maurice L. Fabre, Paris, France, assignors to Societe Nationale d'Etude et de Construction de Moteurs d'Aviation, Paris, France, a company of France Application August 3, 1949, Serial No. 108,388

Claims priority, application France August 4, 1948

2 Claims. (Cl. 123—188)

In internal combustion engines, provided with feed-gas (air or fuel mixture) inlet valves and burnt gas exhaust valves, intake of feed-gas and exhaust of burnt gas are always effected, for each inlet valve and for each exhaust valve, through a single duct for the flow of gas. This flow and consequently the power of the engine depend on the cross-sections of these inlet and exhaust ducts.

The object of the present invention is an internal combustion engine with at least one cylinder head provided with inlet and exhaust valves, wherein each valve is connected to at least two ducts for the flow of gas through it.

According to a feature of the invention, at least the ducts connected to an exhaust valve are laterally located with respect to the valve-stem of said valve.

According to a further feature, said ducts have a crescent-shaped cross-section, the arcs of which are substantially concentric to their corresponding valve-stems, whereby the maximum cross-section consistent with the size of the corresponding cylinder head, is given to said ducts.

Engines designed according to the present invention have numerous advantages relatively to known engines; in particular:

(1) Owing to the increase of the passage cross-section for the fluids related to the operation of the engine, each of these fluids flows more easily and with less duct-loss than in the case of an ordinary engine; hence, the time of intake and the time of exhaust for each cylinder may be decreased;

(2) As a consequence of this first advantage, the speed of the engine and hence its power may be increased;

(3) Burnt gas flows laterally with respect to each exhaust valve-stem, the heating of the latter is thus decreased and operation conditions for each exhaust valve are thus improved;

(4) The above advantages are achieved without entailing any alteration in the valve-gear of the engine.

Other objects and advantages of the invention will be apparent during the course of the following description.

Figure 2:
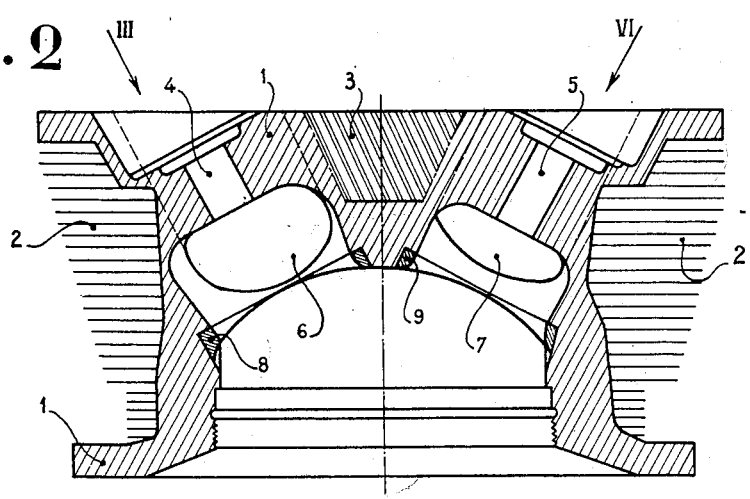
Figure 3:
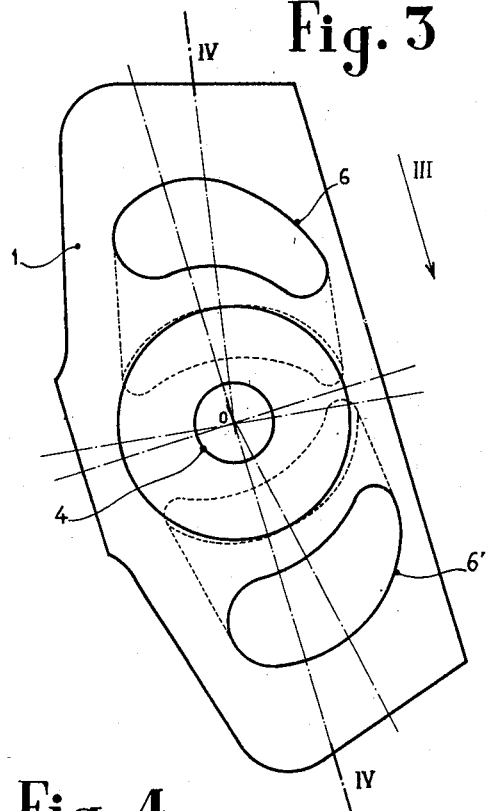
Figure 4:
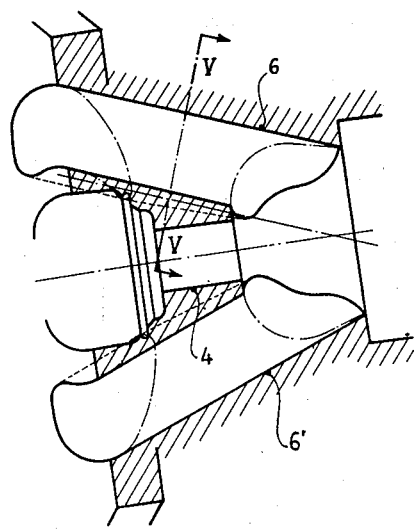
Figure 5:
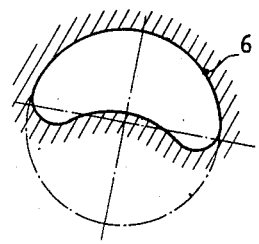
Figure 6:
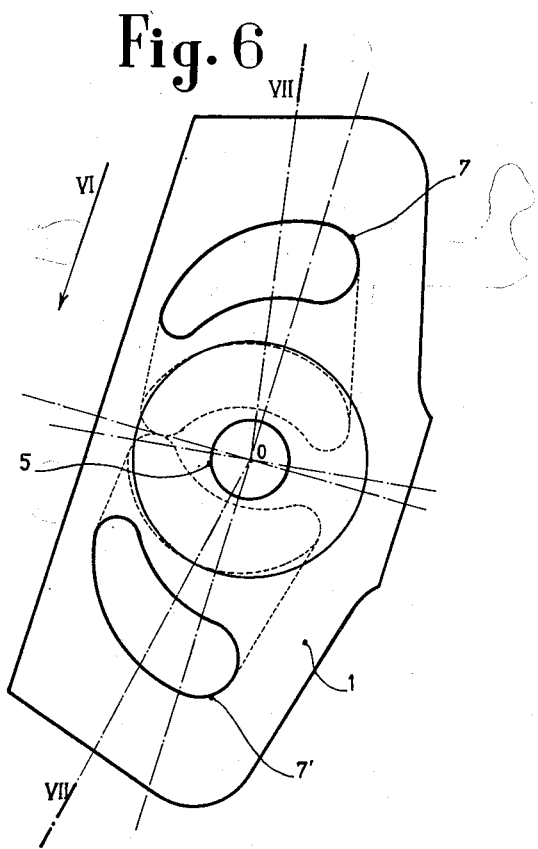
Figure 7:
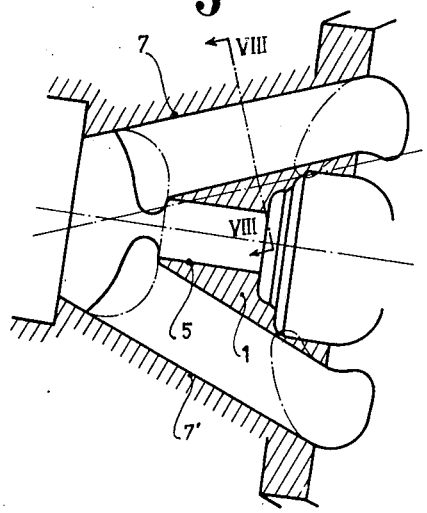
Figure 8:
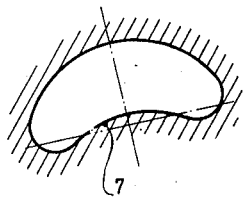
Figure 9:
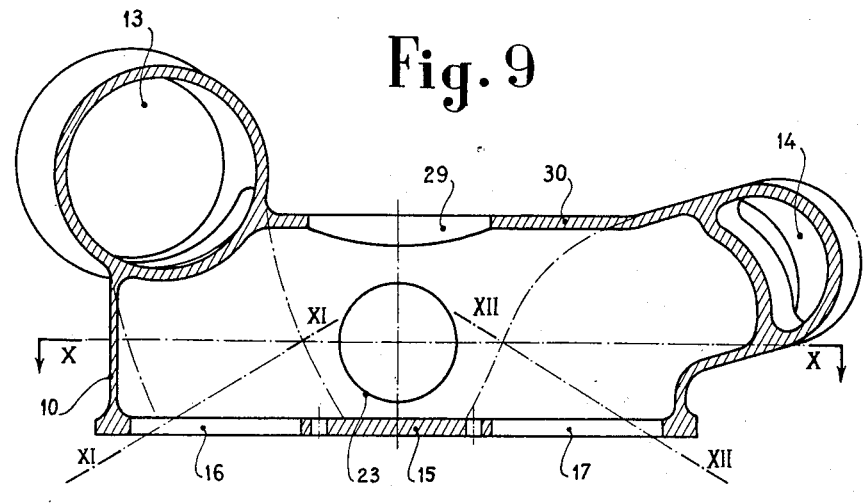
Figure 10:
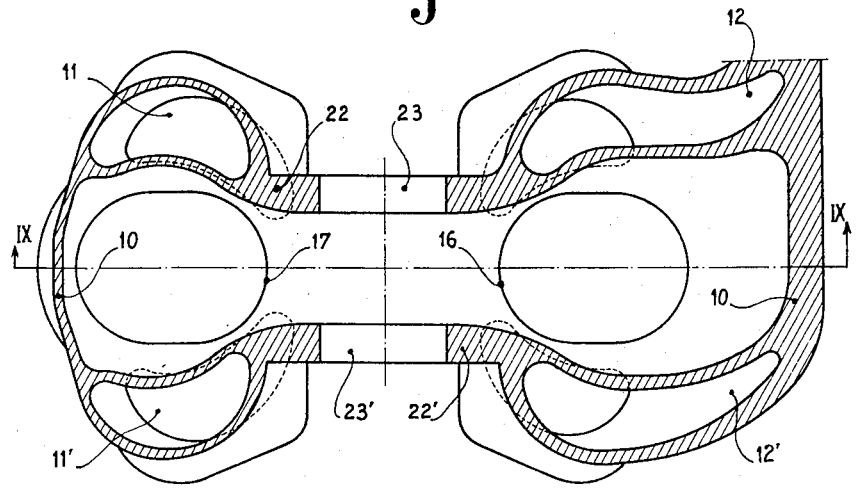
Figure 11:
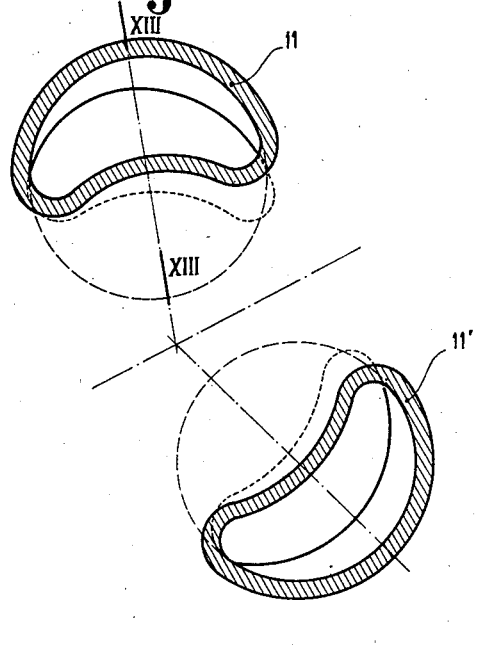
Figure 13:
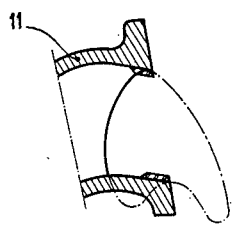
Figure 12:
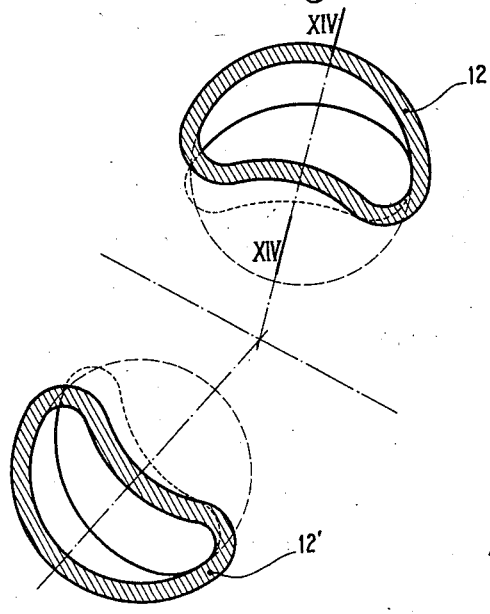
Figure 14:
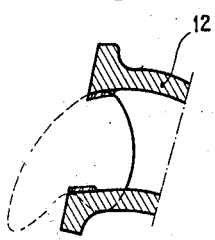
Figure 15:
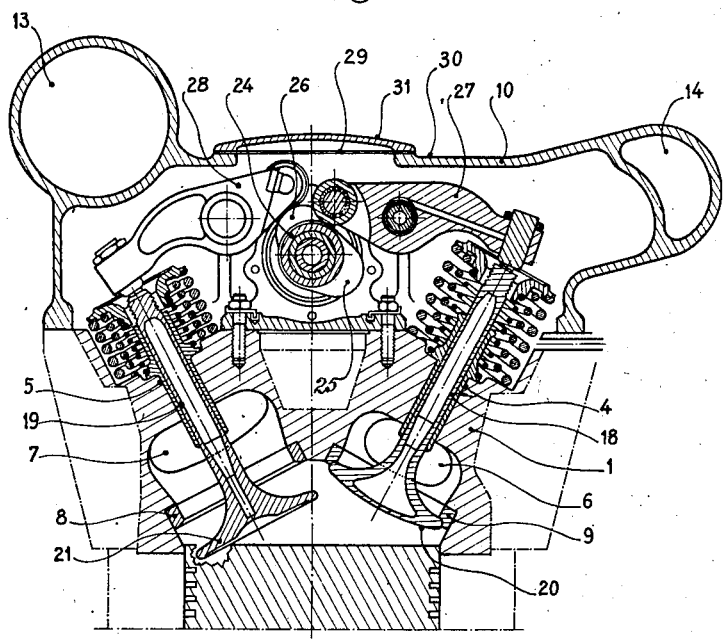
Figure 16:
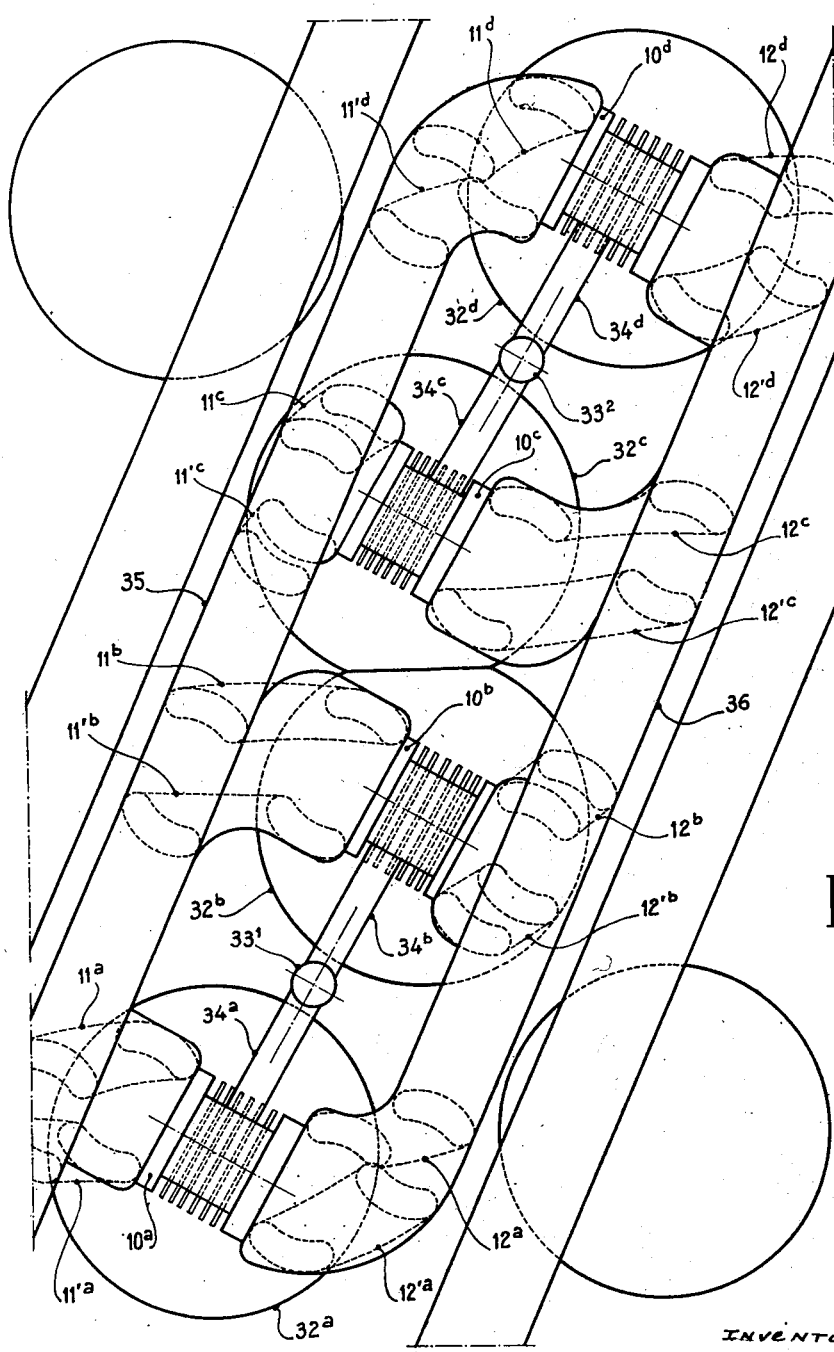

In the accompanying drawing forming a part of this application and in which like numerals are employed to designate like parts throughout the same, Fig. 1 is a view of the outer side of a cylinder head of an engine according to the invention, Fig. 2 is a diametrical cross-section of this cylinder head along line II—II of Fig. 1, Fig. 3 is a projection of this cylinder head perpendicular to arrow III of Fig. 2, Fig. 4 is a section of this cylinder head along broken line IV—0—IV of Fig. 3, Fig. 5 is a section through a lateral duct along line V—V of Fig. 4, Fig. 6 is a projection of the cylinder head perpendicular to arrow VI of Fig. 2, Fig. 7 is a section of this cylinder head along broken line VII—0—VII of Fig. 6, Fig. 8 is a section through a lateral duct along line VIII—VIII of Fig. 7, Figs. 9 and 10 show, on a scale slightly smaller than that of Figs. 1 and 2, the cover of the cylinder head illustrated on these figures, this cover carrying the inlet and exhaust pipes and the connections of the inlet and exhaust ducts of the cylinder head with these pipes; Fig. 9 is a section along line IX—IX of Fig. 10 and Fig. 10 is a section along line X—X of Fig. 9, Fig. 11 is a section perpendicular to the lateral inlet ducts along line XI—XI of Fig. 9, Fig. 12 is a section perpendicular to the lateral exhaust ducts along line XII—XII of Fig. 9, Fig. 13 is a section perpendicular to one of the lateral inlet ducts along line XIII—XIII of Fig. 11, Fig. 14 is a section perpendicular to one of the lateral exhaust ducts along line XIV—XIV of Fig. 12, Fig. 15 is a section along the axes of the inlet and exhaust valves of a cylinder, showing the entire cylinder head, and Fig. 16 is a projection-view, on a cylindrical surface concentric to a 36-cylinder engine arranged in four coaxial nine cylinder radials, of the cylinder heads of four cylinders designed according to the invention, these four cylinders belonging to the four radials of the engine and being fed through a common inlet pipe and exhausted through a common exhaust pipe.

In Figs. 1 and 2, the cylinder head 1 is provided in a known manner with cooling fins 2 and 3 and with a single inlet valve and a single exhaust valve; the inlet valve-stem passes through 4 and the exhaust valve-stem through 5.

According to the present inventoin, two ducts having a crescent-shaped cross-section are laterally located with respect to each of these valve-stems. 6 and 6' are lateral inlet ducts; 7 and 7' are lateral exhaust ducts; 8 and 9 are valve-seats.

Figs. 3 to 8 show details of the arrangement and shape of these various lateral ducts.

In Figs. 9 and 10, the cylinder head cover 10 designed to be fitted on the cylinder head 1 of the previous figures, is a member cast solid in which are provided two inlet ducts 11 and 11' corresponding to the inlet ducts 6 and 6' of the cylinder head 1 and two exhaust ducts 12 and 12' corresponding to the exhaust ducts 7 and 7' of this cylinder head.

The inlet ducts 11 and 11' are further connected to a common inlet pipe 13 and the exhaust ducts 12 and 12' to a common exhaust pipe 14.

This cylinder head cover 10 is also provided, on its joint side 15 applied on the cylinder head 1, with openings 16 and 17 for the valve-stems 18 and 19 of an exhaust valve 20 and an inlet valve 21 respectively, and on its lateral sides 22 and 22' with coaxial openings 23 and 23' for a cam-shaft 24 bearing cams 25 and 26 controlling valve-rockers 27 and 28 respectively associated to the exhaust valve 20 and the inlet valve 21 (Fig. 15).

Lastly, an inspection-hole 29 is provided in the outer wall 30 of the cylinder head cover, opposite the cams and the valve-rockers, in order to allow reaching them; this hole is normally closed by a lid 31.

The above arrangements may be applied to any type of internal combustion engine; they may in particular be applied to radial engines whether single row or multibank.

Fig. 16 shows such an application to a four-row radial engine.

This figure shows four cylinders of this engine, the first one 32$^a$ belonging to the first row of this radial engine, the second one 32$^b$ to the second row, the third one 32$^c$ to the third row, and the fourth one 32$^d$ to the fourth row.

This engine is provided with radial valve control timing shafts, wherein each of these radial timing shafts is common to two adjacent cylinders of two adjacent rows of the engine. In Fig. 16, 33$^1$ represents the head of the sleeve of one of these radial timing shafts ensuring the timing of cylinders 32$^a$ and 32$^b$; 33$^2$ is the head of the sleeve of the radial timing shaft ensuring the timing of cylinders 32$^c$ and 32$^d$. 34$^a$ and 34$^b$ are the sleeves connected to the head 33$^1$ and containing the valve control cam-shafts of the cylinders 32$^a$ and 32$^b$; similarly 34$^c$ and 34$^d$ are the sleeves connected to the head 33$^2$ and containing the valve-control cam-shafts of cylinders 32$^c$ and 32$^d$. 10$^a$, 10$^b$, 10$^c$, 10$^d$ are the cylinder head covers of cylinders 32$^a$, 32$^b$, 32$^c$, 32$^d$ respectively, these covers being connected on one side to a common inlet pipe 35 feeding these four cylinders and on the opposite side to a common exhaust pipe 36 at the outlet of these cylinders.

The considered engine thus comprises several sets of four cylinders identical to the set of four cylinders 32$^a$, 32$^b$, 32$^c$, 32$^d$ which has just been described.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. In an internal combustion engine cylinder the combination comprising a head part having an inner wall which delimits the combustion space of the cylinder, an inlet valve seat, an exhaust valve seat, both seats being located side by side on said wall, two separate chambers arranged inside said head part one above each of said seats, each of said chambers communicating with the combustion space of said cylinder through the corresponding seat only, a stem-guide above each of said chambers coaxially arranged with respect to the corresponding seat, an inlet valve cooperating with the inlet valve seat, an exhaust valve cooperating with the exhaust valve seat, each valve having a stem passing through the corresponding chamber and slidably mounted in the corresponding guide, said valves being adapted to gas-tightly insulate the corresponding chambers from the combustion space of said cylinder, an inlet pipe arranged outside said head part, two ducts in said head part opposite to one another with respect to the stem-guide of said inlet valve, said ducts being both connected to said inlet pipe and ending into the chamber adjacent to the inlet valve seat, an exhaust pipe outside said head part, two ducts bored in said head part opposite to one another with respect to the stem-guide of said exhaust valve, said second-named ducts being both connected to said exhaust pipe and ending into the chamber adjacent to the exhaust valve seat, both first-named ducts having each a crescent-shaped cross-section which is concave towards said inlet valve stem-guide, while both second-named ducts have also each a crescent-shaped cross-section, which is concave towards said exhaust valve stem-guide, the axis of each of said ducts being of an arcual shape such that the angle between the tangent to said axis and the axis of the corresponding stem-guide decreases continuously from the end of the duct into the corresponding chamber to the end thereof connected to the corresponding pipe.

2. The combination of claim 1, wherein the ducts of each pair are convergent towards the corresponding chamber and open into said chamber through apertures which are symmetrical with respect to the valve stem passing through said chamber.

RAYMOND H. MARCHAL.
MAURICE L. FABRE.

References Cited in the file of this patent

UNITED STATES PATENTS

| Number | Name | Date |
|---|---|---|
| 935,323 | Petsche | Sept. 28, 1909 |
| 1,235,816 | Kytlica | Aug. 7, 1917 |
| 2,017,205 | Gingerich | Oct. 15, 1935 |
| 2,387,052 | Bronander | Oct. 16, 1945 |
| 2,426,438 | De Pew | Aug. 26, 1947 |